(12) United States Patent
Aguirre et al.

(10) Patent No.: US 10,519,731 B2
(45) Date of Patent: Dec. 31, 2019

(54) EVALUATION AND MODEL OF SOLIDS CONTROL EQUIPMENT

(71) Applicant: Schlumberger Technology Corporation, Sugar Land, TX (US)

(72) Inventors: Franz Aguirre, Sugar Land, TX (US); Andrew Marlatt, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 15/680,393

(22) Filed: Aug. 18, 2017

(65) Prior Publication Data
US 2019/0055799 A1    Feb. 21, 2019

(51) Int. Cl.
| | | |
|---|---|---|
| E21B 21/06 | (2006.01) |
| E21B 21/08 | (2006.01) |
| E21B 44/00 | (2006.01) |
| G06Q 10/06 | (2012.01) |
| B01D 21/26 | (2006.01) |
| E21B 7/04 | (2006.01) |

(52) U.S. Cl.
CPC ............ *E21B 21/065* (2013.01); *E21B 21/08* (2013.01); *E21B 44/00* (2013.01); *G06Q 10/063* (2013.01); *G06Q 10/067* (2013.01); *G06Q 10/0639* (2013.01); *B01D 21/262* (2013.01); *E21B 7/04* (2013.01)

(58) Field of Classification Search
CPC .................................................. E21B 21/065
See application file for complete search history.

(56) References Cited

U.S. PATENT DOCUMENTS

| | | |
|---|---|---|
| 6,176,323 B1 | 1/2001 | Weirich et al. |
| 6,665,636 B1 | 12/2003 | Allouche et al. |
| 6,823,238 B1 | 11/2004 | Hensley et al. |
| 6,925,392 B2 | 8/2005 | McNeil, III et al. |
| 7,823,656 B1 | 11/2010 | Williams |
| 8,812,236 B1 | 8/2014 | Freeman et al. |
| 9,134,291 B2 | 9/2015 | Jamison et al. |
| 2011/0198076 A1 | 8/2011 | Villreal et al. |
| 2013/0085675 A1 | 4/2013 | Prakash et al. |
| 2015/0211362 A1 | 7/2015 | Rogers |
| 2015/0268374 A1 | 9/2015 | Rapoport |
| 2016/0201412 A1 | 7/2016 | Midlang et al. |
| 2016/0367915 A1* | 12/2016 | Melnyk ................. B01D 21/262 |

(Continued)

FOREIGN PATENT DOCUMENTS

| | | |
|---|---|---|
| EP | 435363 B1 | 5/1996 |
| EP | 507405 B1 | 11/1998 |
| WO | 2013075252 A1 | 5/2013 |

(Continued)

*Primary Examiner* — Giovanna C Wright
(74) *Attorney, Agent, or Firm* — Rachel E. Greene

(57) ABSTRACT

Systems and methods for monitoring characteristics of a drilling mud, a rate of penetration (ROP), and other factors to determine which remedial actions to perform and how to perform them. In conventional drilling operations, there are many systems which operate independently and do not share data, leading to inefficient actions when the operation is viewed as a whole. The systems and methods of the present disclosure enable a bigger picture to be considered, including a cost of replenishing mud, the wear on drilling tools, the effect of running a centrifuge, etc.

21 Claims, 6 Drawing Sheets

(56) References Cited

U.S. PATENT DOCUMENTS

2017/0198554 A1* 7/2017 Dykstra .................. E21B 21/06
2017/0204689 A1* 7/2017 Dykstra ................ E21B 49/005

FOREIGN PATENT DOCUMENTS

| WO | 2015023185 A1 | 2/2015 |
| WO | 2015156893 A1 | 10/2015 |
| WO | 2016171718 A1 | 10/2016 |

* cited by examiner

EVALUATION AND MODEL OF SOLIDS CONTROL EQUIPMENT

BACKGROUND

Oilwell drilling operations use drilling fluid, sometimes called drilling mud or mud, to circulate material out of the well as the drilling operation is carried out. The mud contains material called solids, some of which are part of the mud itself and are desirable and promote efficient drilling (the good solids), and some of which are detrimental to the operation (the bad or drilled solids). To manage the drilling operation, many rigs use a solids control equipment that removes solids from the mud; however, many of these techniques remove both the good solids and the bad solids from the mud. Solids are conventionally removed by a series of equipment, each of which is designed to remove solids of various types and sizes. However, the efficiency of each piece of equipment is usually unknown. Rather, all work is done empirically and usually by different providers whose interests are not aligned, nor is their data shared. These different parties operate virtually completely independently from one another and each optimizes its own efficiently without regard to the whole picture. One result is that it is unknown how much of the solids remain in a fluid or if all undesired solids have already been removed. Also, the discarded removed solids are never dry and there is a significant amount of valuable mud that is discarded with these solids. This is highly inefficient because equipment may be run that does not need to be run, the wrong equipment may be run, or the wrong settings may be used. The financial impact of the solids removal operation can be high, however the efficiency of solids control equipment at removing drilled solids is rarely monitored with actual measurements. Current evaluations would entail a highly manual and time-intensive retort process, and due to the nature of many rigs using different providers there is no clear way to sharing data and optimizing on the big picture rather than for each component and each provider.

SUMMARY

Embodiments of the present disclosure are directed to a system including a drilling mud circulation system configured to circulate drilling mud for a drilling operation. The drilling operation has a rate of penetration (ROP). The system also includes a solids removal component configured to selectively remove solid material from the mud, and a measurement component configured to produce a measurement of at least one characteristic of the drilling mud. The system further includes a computation module configured to receive the measurement from the measurement component, receive the ROP for the drilling operation, and alter at least one parameter of the drilling operation according to a comparison of the measurement and the ROP according to a model stored within the computation module. The computation component is further configured to receive data pertaining to one or more drilling systems, and the model is configured to factor in a cost of operating the one or more drilling systems.

In other embodiments the present disclosure is directed to a method including circulating drilling mud through a drilling mud circulation system for use with a drilling operation, monitoring a characteristic of the drilling mud, and storing data pertaining to the characteristic of the drilling mud and a remedial action that can alter the characteristic of the drilling mud. The remedial action has an associated cost. The method also includes monitoring a rate of penetration (ROP) of the drilling operation, and if the ROP decreases below a predetermined threshold, performing the remedial action if an expected change in ROP outweighs the associated cost of the remedial action.

Still further embodiments of the present disclosure are directed to a method including circulating drilling mud through a drilling operation on an oil rig, and periodically operating a centrifuge configured to remove solid material from the drilling mud. The centrifuge operation can include feeding a portion of the drilling mud to the centrifuge and spinning the centrifuge to remove the solid material. The method also includes monitoring a concentration of solid material in the drilling mud, and monitoring a rate of penetration (ROP) for the drilling operation. The method includes increasing a rate of the centrifuge if the ROP falls below a predetermined threshold and if the concentration of solid material in the drilling mud is higher than approximately 5%. The method can also include monitoring drilling equipment used for the drilling operation for possible wear associated with operating the centrifuge at the increased rate, calculating a cost of the wear, and increasing the rate of the centrifuge if the cost of the wear is less than a benefit achieved by increasing the rate of the centrifuge.

DETAILED DESCRIPTION

Below is a detailed description according to various embodiments of the present disclosure. The present disclosure is described with reference to the features. It is to be understood that certain features of the present disclosure will become clear from the following description and that certain examples are given in an effort to describe the present disclosure and are not given in a limiting way.

Figure 1:
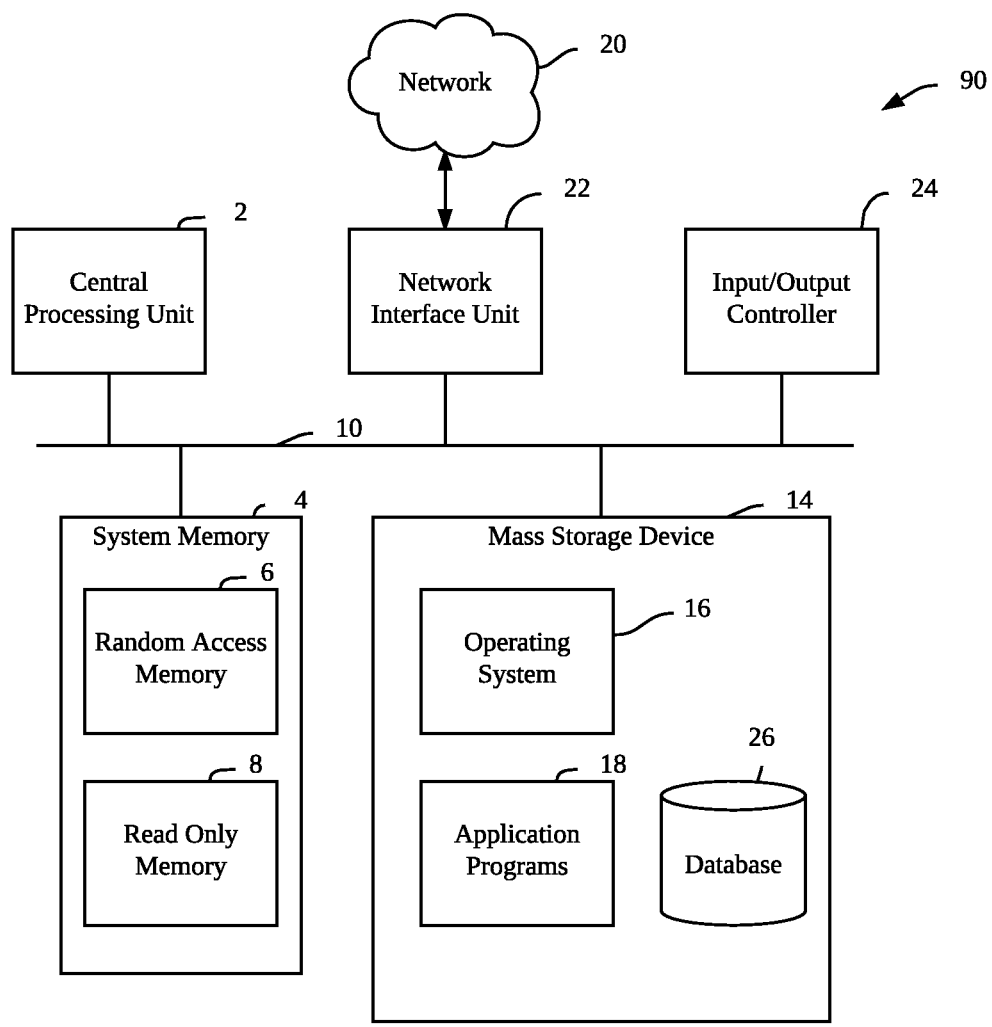
FIG. 1 is a block diagram of an operating environment for implementations of computer-implemented methods according to embodiments of the present disclosure.

FIG. 1 is a block diagram of an operating environment for implementations of computer-implemented methods according to embodiments of the present disclosure. FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 90 utilized in the various embodiments will be described. The computer architecture shown in FIG. 1 may be configured as a desktop or mobile computer and includes a central processing unit 2 ("CPU"), a system memory 4, including a random access memory 6 ("RAM") and a read-only memory ("ROM") 8, and a system bus 10 that couples the memory to the CPU 2.

A basic input/output system containing the basic routines that help to transfer information between elements within the computer, such as during startup, is stored in the ROM 8. The computer 90 further includes a mass storage device 14 for storing an operating system 16, application programs 18, and other program modules, which will be described in greater detail below.

The mass storage device 14 is connected to the CPU 2 through a mass storage controller (not shown) connected to the bus 10. The mass storage device 14 and its associated computer-readable media provide non-volatile storage for the computer 90. Although the description of computer-readable media contained herein refers to a mass storage device, such as a hard disk or CD-ROM drive, the computer-readable media can be any available media that can be accessed by the computer 90. The mass storage device 14 can also contain one or more databases 26.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 90.

According to various embodiments, computer 90 may operate in a networked environment using logical connections to remote computers through a network 20, such as the Internet. The computer 90 may connect to the network 20 through a network interface unit 22 connected to the bus 10. The network connection may be wireless and/or wired. The network interface unit 22 may also be utilized to connect to other types of networks and remote computer systems. The computer 90 may also include an input/output controller 24 for receiving and processing input from a number of other devices, including a keyboard, mouse, or electronic stylus (not shown in FIG. 1). Similarly, an input/output controller 24 may provide output to a display screen, a printer, or other type of output device (not shown).

As mentioned briefly above, a number of program modules and data files may be stored in the mass storage device 14 and RAM 6 of the computer 90, including an operating system 16 suitable for controlling the operation of a networked personal computer. The mass storage device 14 and RAM 6 may also store one or more program modules. In particular, the mass storage device 14 and the RAM 6 may store one or more application programs 18.

Figure 2:
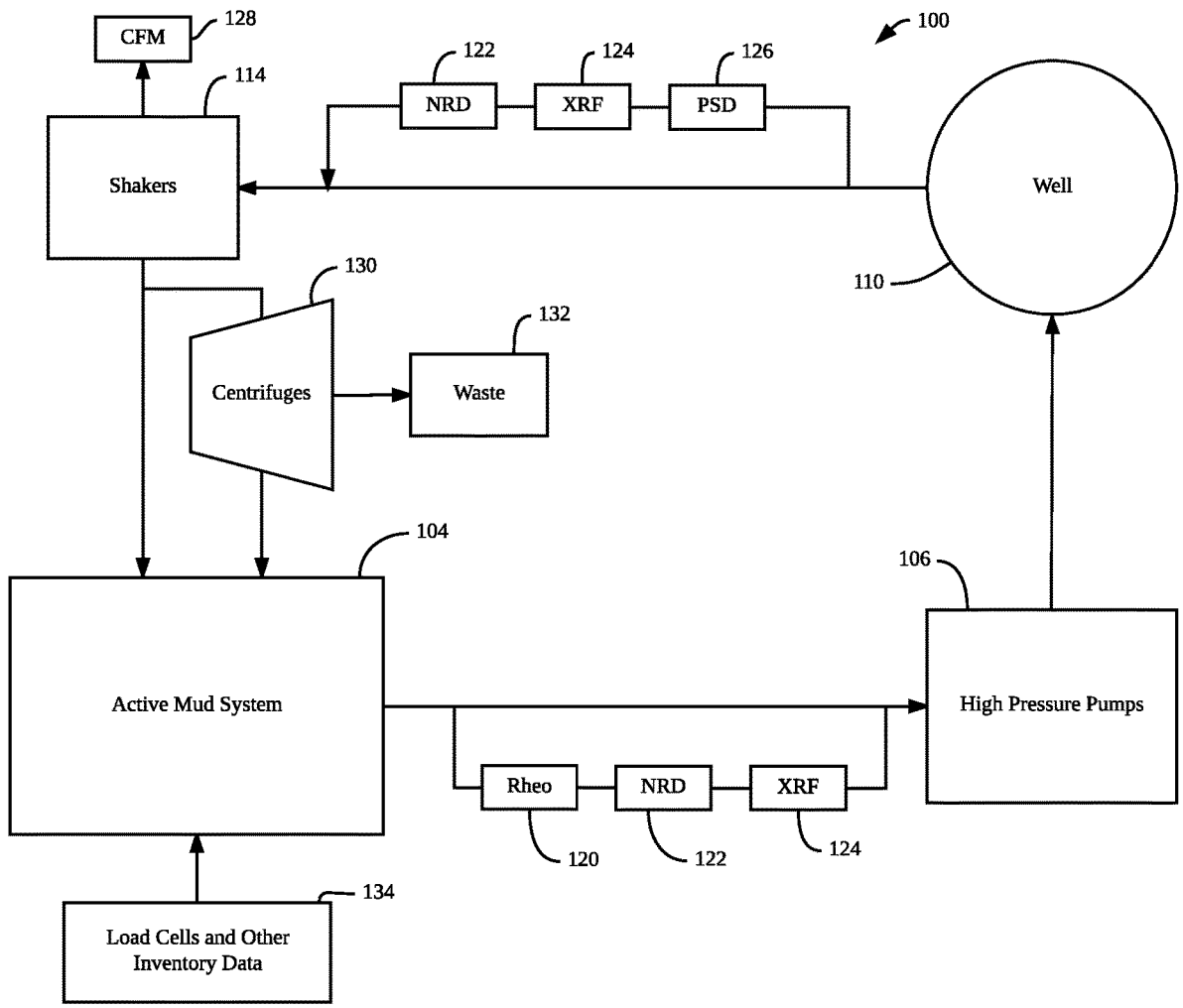
FIG. 2 is a schematic illustration of a mud cycle for a drilling operation according to embodiments of the present disclosure.

FIG. 2 is a schematic illustration of a mud cycle 100 for a drilling operation according to embodiments of the present disclosure. Aspects of the mud cycle 100 are described and shown herein in schematic to highlight certain features of the present disclosure and to avoid obscuring certain details of the present disclosure. A person of ordinary skill in the art will understand there are details of the mud cycle 100 which are not given here but that the present disclosure provides sufficient information and support to enable making and using the features disclosed herein without undue experimentation. The mud cycle 100 is a continuous loop which is circulated through as the drilling is being performed. The mud cycle 100 includes an active mud system 104 which includes a storage tank, piping, pumps, and other components which are not described in detail here. These instruments can be used to measure solids content, chemical composition of all phases and particle size distribution, viscosity and density, discharge and reject of solids removal equipment such as shale shakers, hydro cyclones, centrifuges, dewatering tanks, mud cleaners and settling pits/tanks. The active mud system 104 feeds the mud into high pressure pumps 106, which in turn pump the mud into the well 110 where the drilling occurs. From the well 110 the mud is transported to shakers 114 which use vibration energy and screens to remove cuttings and other undesirable debris from the mud before the mud returns to the active mud system 104. This is one example of a main loop of the mud cycle 100 as is known in the art.

There are various departures from the main line, including before reaching the high pressure pumps 106 the mud can be diverted to a few components, such as a Rheology measurement component 120, a non-radioactive densitometer (NRD) 122, or an X-ray fluorescence component (XRF) 124. These components can be used together or individually to measure various properties of the mud, including density and viscosity. Between the well 110 and the shakers 114 the mud can be analyzed again by another non-radioactive densitometer 122 and/or X-ray fluorescence component 124, and by a particle size distribution measurement component (PSD) 126. A cuttings flow meter (CFM) 128 can be used to measure the cuttings as they are removed from the mud at the shaker 114. These components enable certain measurements of mud properties at various stages in the mud cycle 100. They can be departures from the main line or they can be embedded within the main line fluid flow.

The mud cycle 100 can include a centrifuge 130 which can be used to remove solids from the mud. In some embodiments the centrifuge is used on a portion of the mud which is separated from the main line before reaching the active mud system 104 and returned to the active mud system 104 after processing. Removed material is discarded as waste 132. In many applications there is a fair amount of good solids and good mud that finds its way into the waste 132. A certain amount of waste may be acceptable when other factors are considered as will be described further herein. Also, the centrifuges remove both desirable solids and undesirable solids from the mud so running the centrifuge 130 has a benefit in the removal of bad solids and a cost in terms of time, resources, and energy to run and also the good solids and good mud which is wasted. Good solids must be returned to the mud to replenish the supply. The mud cycle 100 also includes load cells and other inventory data 134 which are used to measure a quantity of products being added to the mud by an automated mud mixing system. In today's oil field drilling operations, these components are operated by different companies and many of them do not share data from one to another. Their definition of success can differ as well, leading to macro inefficiencies. For example, suppose a first company operates the centrifuge, and another company supplies the desirable solids which need to be returned to the mud. The first company may measure their success by the amount of bad solids their centrifuges remove from the mud. They may not even check to see how much good mud and good solids they are removing! This company will operate to maximize their contribution in terms of bad solids removed. The second company does not mind this, however, because the more good solids the first company removes, the more they can sell to replenish the supply. This is one example of how different parties operating different components and without sharing data and without looking at the overall impact on the drilling operation can adversely affect the big picture.

Figure 3:
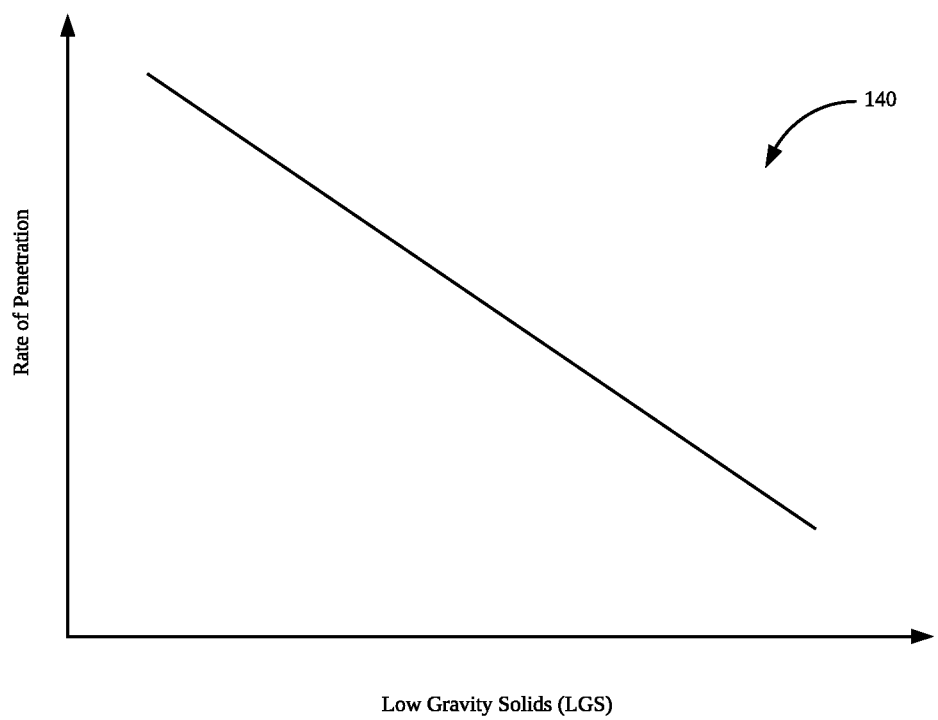
FIG. 3 is a graph 140 representing a relationship between drilling Rate of Penetration (ROP) and the presence of low gravity solids (LGS) in the mud according to embodiments of the present disclosure.

FIG. 3 is a graph 140 representing a relationship between drilling Rate of Penetration (ROP) and the presence of low gravity solids (LGS) in the mud. As can be seen in the graph, the greater the concentration of LGS in the mud, the lower the ROP will be. This factor along with many others are considered according to the present disclosure and are used together to execute a drilling operation to improved efficiency.

Figure 4:
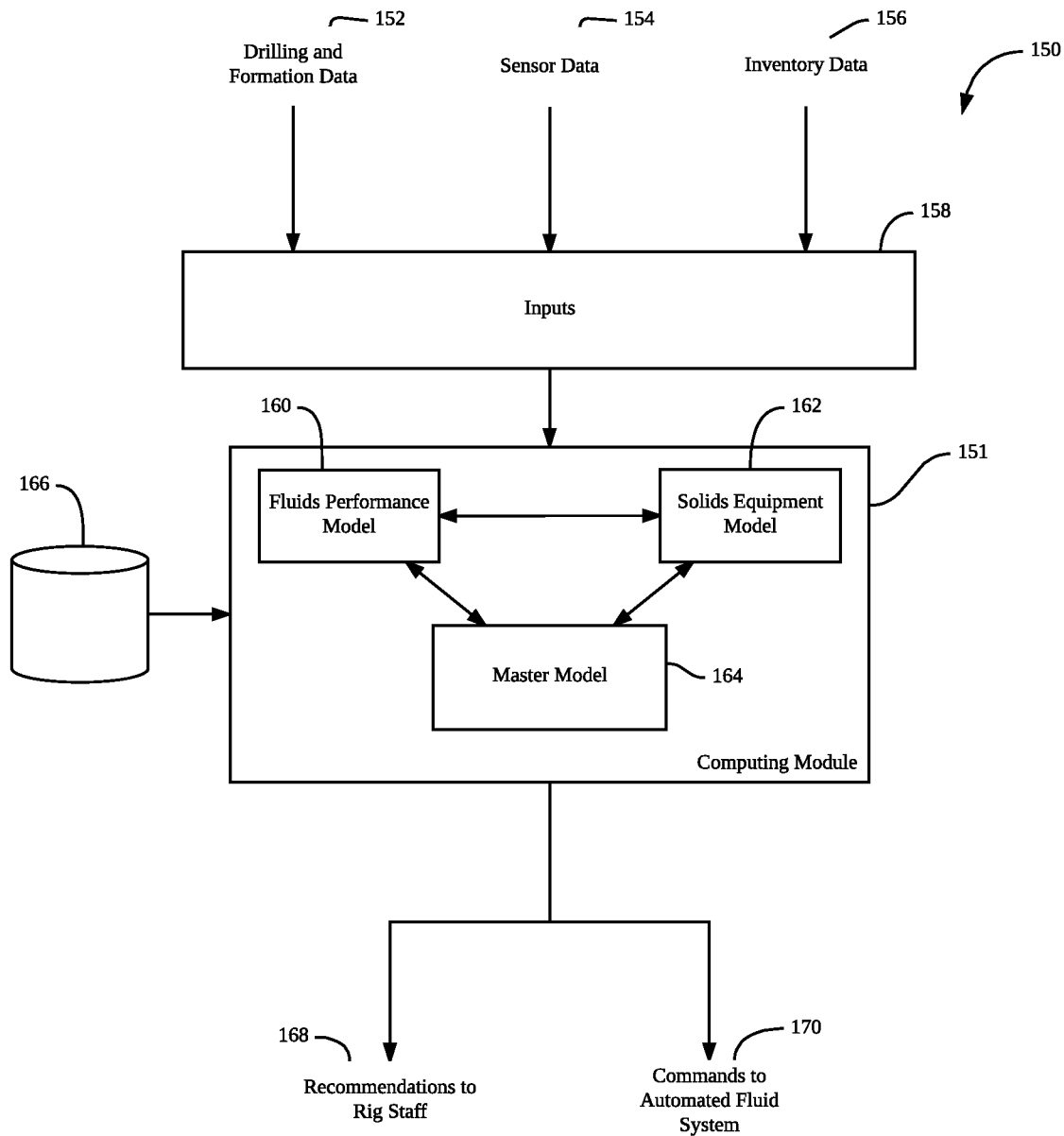
FIG. 4 is a schematic block diagram of a system for incorporating data from multiple sources and with an eye toward comprehensive efficiency according to embodiments of the present disclosure.

FIG. 4 is a schematic block diagram of a system 150 for incorporating data from multiple sources and with an eye toward comprehensive efficiency according to embodiments of the present disclosure. In some embodiments, all the components discussed in FIG. 4 belong to a single company such as SCHLUMBERGER. Drilling and formation data 152 refers to data obtained through various sensors in the well and within the drilling operation. It includes parameters such as ROP, pressure, temperature, etc. pertaining to the drilling operation. Sensor data 154 refers to more general sensor data from around the rig, including mud cycle sensors discussed above, such as a rheometer, NRD, XRF, etc. Inventory load data 156 refers to inventory of products for the mud such as the desirable solids and other fluids on hand for use in the mud in the event that replenishing these components is necessary. Collectively, these are the inputs 158.

The inputs 158 can be communicated to a computing module 151 which is configured aggregate and perform calculations upon the data received from the inputs 158. The computing module 151 can be a standard personal computer (PC), mainframe, embedded controller, or a remote server in various embodiments. Within the computing module are various models for calculating and analyzing the data from the inputs and for making an informed recommendation as to how the drilling operation should be operated in response to the inputs 158. There can be various models, including a fluids performance model 160, a solids equipment model 162, and a master model 164. The inputs 158 are fed into the computing module 151 which implements the fluids performance model 160 and solids equipment model 162 for data analytics that provide for a suggested adjustment of operating parameters to optimize the drilling operation. The fluids performance model 160 can focus more on the characteristics of the fluids and the solids equipment model 162 can focus more closely on equipment related to the solids in the mud, removed from the mud, and reinstated back into the mud to replenish the mud. Together, these models can make up the master model 164. In some embodiments, the master model 164 can be a third model incorporating yet other factors. The models can communicate with one another and share data. The master model 164 can be an aggregated model including information from any number of other models.

The computing module 151 can receive information from a database 166, and can store data in the database 166. The database 166 can store data describing wear on tools v. LGS, hole cleaning vs ROP, LGS vs ROP, etc. Virtually any factor that can be measured can be included in the master model 164 (or any of the other models) to optimize the drilling operation. The models can optimize removal of undesired solids without removing excessive desired solids such as weighting agents and clays, providing for a cost savings in the quantity of additives added during mud conditioning. The models can work reactively as well as predictively. As the system is used, more and more data is recorded in the database 166 and can be used to further improve the operation of the drilling operation. Once there is sufficient data, the master model 164 can be run in a predictive way to anticipate how a certain input or circumstance will affect the drilling operation. For example, in a predictive use, when drilling through known formations, the starting point of the solids removal equipment can be proposed by the model 164.

Additionally, in addition to optimization of equipment in real-time fashion, the models can also provide an indicator for failure events within the equipment. For example, when there are sudden inconsistencies or changes in solids control equipment (such as when a hole is punched through on the shaker screen). When failures occur, an amount of larger solids than the next stage of equipment can handle would be flowing to that next stage of equipment, causing potential failure of that piece of equipment as well. Thus, when sudden changes in solids content are observed at any stage, an alert can be issued so that equipment failure/problems can be investigated in a more expedient manner.

The models can be used with any number of variants of solids controls equipment, including shakers, centrifuges, hydrocyclones, centrifuges, mud cleaners, desanders, desilters, and dewatering units. They models can also be utilized to provide recommendations and predictions of what equipment and configurations are ideal at the start of a new well. These predictions can include the potential to accommodate dilution of drilling fluid as a method of solids control. The models can also be used in an advisory capacity to predict operating modes for solids control equipment, for example determining continuous or intermittent run time schedules for centrifuges. The models can be used to provide recommendations to rig staff 168 or to give commands to an automated fluid system 170.

Figure 5:
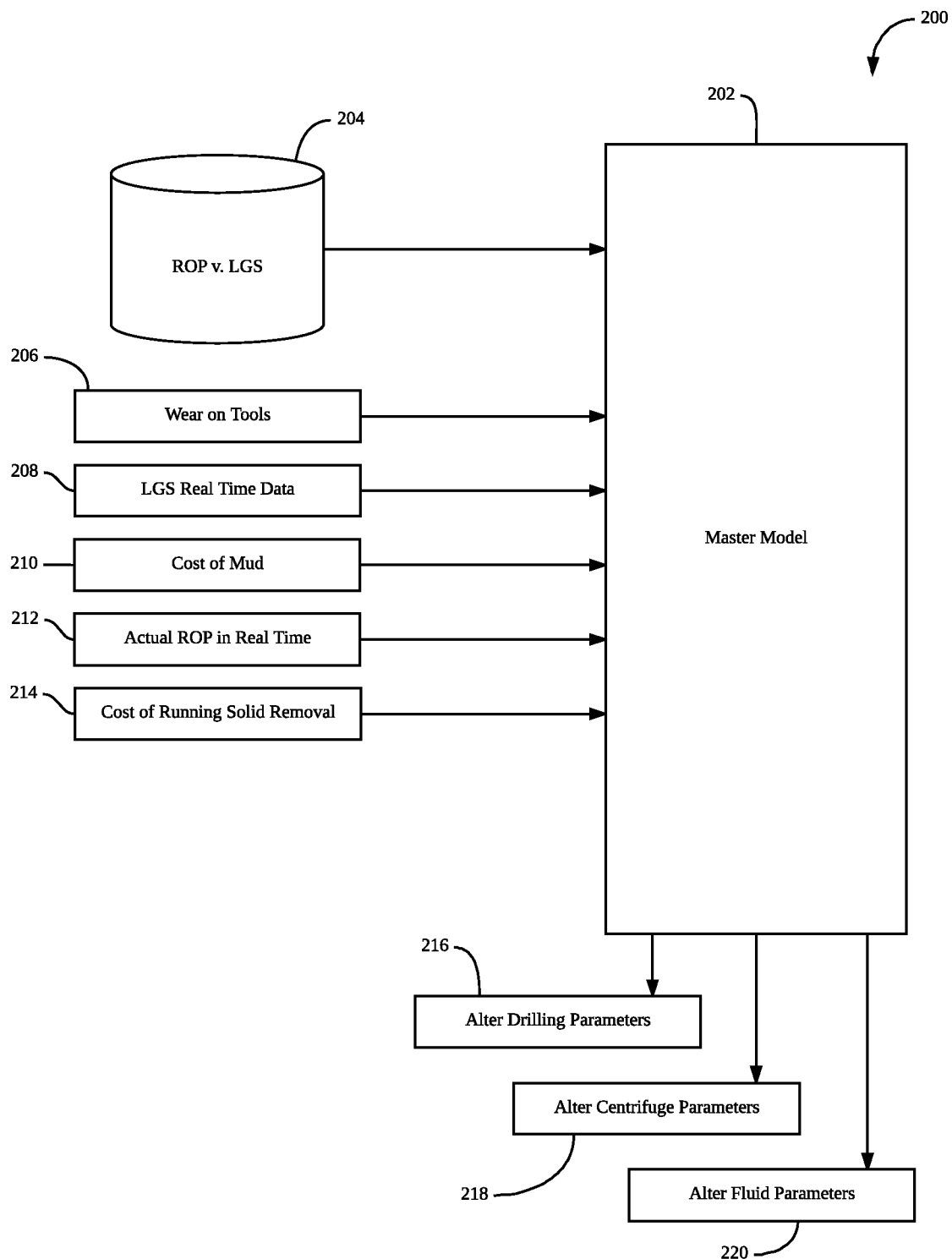
FIG. 5 is another schematic block diagram of a system using a master model according to embodiments of the present disclosure.

FIG. 5 is another schematic block diagram of a system 200 using a master model 202 according to embodiments of the present disclosure. The master model 202 can include any number of sub-models which may operate on different inputs and have different outputs than those described here, such as the fluids performance model and solids equipment models described in FIG. 4. The master model 202 can be one of several models used in a given operation according to the present disclosure. The master model 202 can receive inputs from a database 204 of rate of penetration (ROP) and low gravity solids (LGS) which are the bad solids which are desirably removed from the mud and which can reduce the ROP. As shown in FIG. 3, the relationship between ROP and LGS is generally inverse: more LGS generally means less ROP. The actual curve can be measured over many drilling operations and contained in the database 204. Once sufficient data is obtained over a sufficiently long period of time the database 204 will contain reliable data which can be relied upon more heavily than before such information is available.

The master model 202 also receives inputs from measurements taken throughout a drilling operation, including wear on tools 206, LGS real time data 208, the cost of mud 210, actual ROP in real time 212, and the cost of running solid removal 214. The wear on tools 206 refers to the wear and tear and other deterioration associated with performing a given operation. One example of this is "measurements-while-drilling" (MWD) tools. MWD refers to the evaluation of physical properties, usually including pressure, temperature and wellbore trajectory in three-dimensional space, while extending a wellbore. MWD is used in offshore directional wells, where the tool cost is offset by rig time and wellbore stability considerations if other tools are used. The measurements are made downhole, stored in solid-state memory for some time and later transmitted to the surface. Data transmission methods vary, but usually involve digitally encoding data and transmitting to the surface as pressure pulses in the mud system. These pressures may be positive, negative or continuous sine waves. Some MWD tools have the ability to store the measurements for later retrieval with wireline or when the tool is tripped out of the hole if the data transmission link fails. MWD tools that measure formation parameters (resistivity, porosity, sonic velocity, gamma ray) are referred to as logging-while-drilling (LWD) tools. LWD tools use similar data storage and transmission systems, with some having more solid-state memory to provide higher resolution logs after the tool is tripped out than is possible with the relatively low bandwidth, mud-pulse data transmission system. Another tool is a rotary steerable system (RSS), which is a tool designed to drill directionally with continuous rotation from the surface, eliminating the need to slide a steerable motor. Rotary steerable systems typically are deployed when drilling directional, horizontal, or extended-reach wells. State-of-the-art rotary steerable systems have minimal interaction with the borehole, thereby preserving borehole quality. The most advanced systems exert consistent side force similar to traditional stabilizers that rotate with the drillstring or orient the bit in the desired direction while continuously rotating at the same number of rotations per minute as the drillstring. Some of these tools serve as conduits for mud, and some operations increase the abrasive flow of mud through the tool. The abrasion rate can be known or estimated and the cost of the abrasion is factored into the master model 202.

Other factors include LGS real time data 208, referring to data that is collected from measurement systems and sensors which measure the concentration of LGS in the mud in real time. The cost of mud 210 is the cost to clean or replace mud lost as waste from the centrifuges or other equipment, and the cost of replenishing the mud with good solids. The actual ROP in real time 212 can be measured from the drilling equipment directly or indirectly. The cost of running solid removal 214 is the cost of operating the equipment and the materials required. Experience has shown that maintaining the LGS below approximately 5% enables a high ROP. The sensors can measure the LGS in the mud at one or multiple places in the mud cycle and if the concentration becomes too high the ROP may decrease, but if the LGS becomes much lower than 5% there may be other consequences, such as the increased cost of achieving such a low number. Theoretically, a mud with 0% LGS will have a higher ROP, but there are diminishing returns on reducing the LGS concentration so low. The ROP may be only very slightly improved by lowering the LGS concentration from 2% to 1%, and still less from 1% to 0%. The cost of achieving a given LGS concentration and the effect on the ROP are factored into the master model 202. The master model 202 has access to this information which under traditional practices is not available because the disparate components are operated by different companies or different, incompatible systems which do not or cannot share this data.

The master model 202 can use the information gathered in various ways, including altering drilling parameters 216 such as the rotation rate of the bit or other parameters. The master model 202 can alter centrifuge parameters 218 and fluid parameters 220 such as the rate at which mud enters the centrifuge, known as the feed rate, the rotations per minute (RPM) of the centrifuge, or the viscosity of the mud. Stoke's law states:

$$V = \frac{D^2(\rho_s \, \rho_l)}{\mu}$$

Where V is the velocity in rpm, D is the diameter of the cuttings, $\rho_s$ is the density of the solids, $\rho_l$ is the density of the liquid, and $\mu$ is the viscosity of the mud. The velocity can be altered by adjusting the motor on the centrifuge. The viscosity of the mud can be altered by applying heat to the mud or by adding products including chemical products to the mud. These parameters and others can be altered according to the direction from the master model 202.

Figure 6:
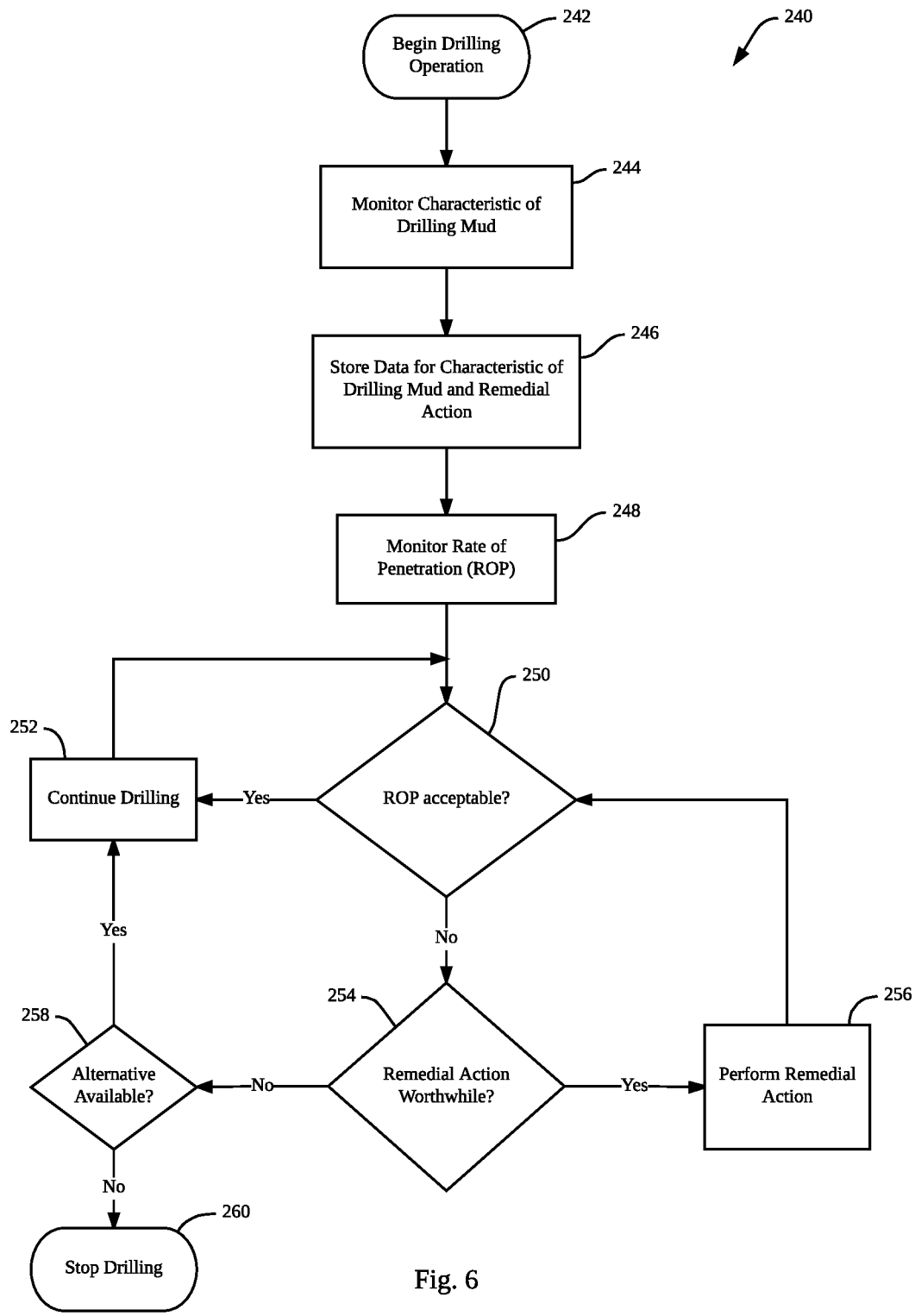
FIG. 6 is a flowchart diagram of a method according to embodiments of the present disclosure.

FIG. 6 is a flowchart diagram of a method 240 according to embodiments of the present disclosure. The method includes beginning a drilling operation at 242. The method 240 can initiate after the drilling operation has begun for the first time, or it can initiate simultaneously with the drilling operation. At 244 the method 240 includes monitoring a characteristic of the drilling mud, such as viscosity, concentration of LGS, concentration of cuttings, temperature, etc. Virtually any characteristic of the drilling mud can be considered. Multiple characteristics can be monitored. The method 240 includes at 246 storing data for the characteristic(s) of the drilling mud and information relating to a remedial action can also be maintained. For example, if the characteristic being monitored is the concentration of LGS, the remedial action can be to alter the operation of a centrifuge to remove solids. The method 240 continues at 248 by monitoring a rate of penetration for the drilling operation. The ROP can be defined in terms of distance per unit time and refers to how deep the well is being drilled in what time. At 250 the method 240 includes checking the ROP against predefined parameters such as expected ROP or desired ROP. If the ROP is acceptable, at 252 drilling continues. The decision of whether or not to continue drilling or whether or not to alter the drilling operation can be made based on multiple factors, but so long as the ROP is acceptable, other factors such as LGS concentration will not necessarily cause a change. Without common ownership or at least significant compatibility of sharing data between drilling rig equipment, such a decision is unlikely to be made in this way. In some conventional drilling operations, the presence of an elevated LGS concentration per se would trigger a remedial action, without considering the larger picture.

In some embodiments of the present disclosure, if the ROP is unacceptable, another check is performed at 254. The impact of the remedial action is compared against the cost of performing it. This analysis can be made using a computing module as described in detail above, and can use data from prior drilling operations. For example, if a similar drilling situation has been encountered in the past and the parameters match the current operation, the data from that earlier remedial action can be used to inform the current decisions. If the cost-benefit analysis is worthwhile, the method includes to perform the remedial action 256. After the remedial action control returns to checking the ROP for acceptability. If the remedial action is not worthwhile, the method 240 can include yet another check at 258 for an alternative. If so, drilling can continue; if not, the method 240 can result in stopping the job at 260. In some embodiments, one available alternative would be to continue drilling despite the need of the remedial action. Some remedial actions are minor and drilling may be continued even without remedial action if the cost of the remedy outweighs the benefit of performing it.

The foregoing disclosure hereby enables a person of ordinary skill in the art to make and use the disclosed systems without undue experimentation. Certain examples are given to for purposes of explanation and are not given in a limiting manner.

The invention claimed is:

1. A system, comprising:
   a drilling mud circulation system configured to circulate drilling mud for a drilling operation, wherein the drilling operation has a rate of penetration (ROP);
   a solids removal component configured to selectively remove solid material from the mud;
   a measurement component configured to produce a measurement of at least one characteristic of the drilling mud;
   a computation module configured to:
      receive the measurement from the measurement component;
      receive the ROP for the drilling operation; and
      alter at least one parameter of the drilling operation according to a comparison of the measurement and the ROP according to a model stored within the computation module.

2. The system of claim 1 wherein the solids removal component comprises a centrifuge.

3. The system of claim 2 wherein the at least one characteristic of the drilling mud comprises a concentration of low gravity solids in the mud.

4. The system of claim 3 wherein a computation component is further configured to receive data pertaining to one or more drilling systems and wherein the model is configured to factor in a cost of operating the one or more drilling systems.

5. The system of claim 4 wherein the one or more drilling systems comprises a measurement-while-drilling tool or a rotary steerable system.

6. The system of claim 3 wherein a computation component is further configured to receive data pertaining to a cost of replenishing the drilling mud after the solids removal component selectively removes the solid material from the mud.

7. The system of claim 2 wherein the computation module is configured to alter the at least one parameter of the drilling operation, and wherein the at least one parameter of the drilling operation comprises altering a rotational rate of the centrifuge.

8. The system of claim 1 wherein the computation module is configured to alter the at least one parameter of the drilling operation, and wherein the at least one parameter of the drilling operation comprises altering a feed rate to the solids removal component.

9. The system of claim 1 wherein the computation module is configured to alter the at least one parameter of the drilling operation, and wherein the at least one parameter of the drilling operation comprises altering a viscosity of the mud.

10. The system of claim 9 wherein altering the viscosity of the mud comprises heating the mud.

11. The system of claim 1 wherein the computation module is configured to alter the at least one parameter of the drilling operation, and wherein the at least one parameter of the drilling operation comprises altering the ROP.

12. A method, comprising:
    circulating drilling mud through a drilling mud circulation system for use with a drilling operation;
    monitoring a characteristic of the drilling mud;
    storing data pertaining to the characteristic of the drilling mud and a remedial action that can alter the characteristic of the drilling mud, wherein the remedial action has an associated cost;
    monitoring a rate of penetration (ROP) of the drilling operation; and
    if the ROP decreases below a predetermined threshold, performing the remedial action if an expected change in ROP outweighs the associated cost of the remedial action.

13. The method of claim 12 wherein monitoring a characteristic of the drilling mud comprises at least one of monitoring a concentration of low gravity solids, monitoring a viscosity of the drilling mud, or monitoring a concentration of cuttings within the drilling mud.

14. The method of claim 12 wherein performing the remedial action comprises altering at least one of a feed rate to a centrifuge, altering a rotation rate of a centrifuge, or altering a viscosity of the drilling mud.

15. The method of claim 14 wherein altering the viscosity of the drilling mud comprises heating the drilling mud.

16. The method of claim 12 wherein performing the remedial action comprises altering a rate of drilling of the drilling operation.

17. The method of claim 12 wherein the cost of the remedial action includes at least one of wear on a drilling tool that would be affected by performing the remedial action and a cost of replenishing the drilling mud.

18. The method of claim 12, further comprising maintaining a database of information relating an effect of the remedial action and the rate of penetration achieved as a result of performing the remedial action.

19. A method, comprising:
    circulating drilling mud through a drilling operation on an oil rig;
    periodically operating a centrifuge configured to remove solid material from the drilling mud, including feeding a portion of the drilling mud to the centrifuge and spinning the centrifuge to remove the solid material;
    monitoring a concentration of solid material in the drilling mud;
    monitoring a rate of penetration (ROP) for the drilling operation;
    increasing a rate of the centrifuge if the ROP falls below a predetermined threshold and if the concentration of solid material in the drilling mud is higher than approximately 5%.

20. The method of claim 19 wherein increasing the rate of the centrifuge comprises heating the drilling mud to alter viscosity.

21. The method of claim 19, further comprising:
monitoring drilling equipment used for the drilling operation for possible wear associated with operating the centrifuge at the increased rate;
calculating a cost of the wear; and
increasing the rate of the centrifuge if the cost of the wear is less than a cost achieved by increasing the rate of the centrifuge.

\* \* \* \* \*